Sept. 29, 1942.   A. R. GRAD   2,297,055
TWISTING MACHINE
Filed April 29, 1940   4 Sheets-Sheet 1

INVENTOR.
ADOLF R. GRAD
BY
ATTORNEY.

Sept. 29, 1942.  A. R. GRAD  2,297,055
TWISTING MACHINE
Filed April 29, 1940  4 Sheets-Sheet 2

INVENTOR.
ADOLF R. GRAD
BY
ATTORNEY.

Sept. 29, 1942.   A. R. GRAD   2,297,055
TWISTING MACHINE
Filed April 29, 1940   4 Sheets-Sheet 3

INVENTOR.
ADOLF R. GRAD
BY
ATTORNEY.

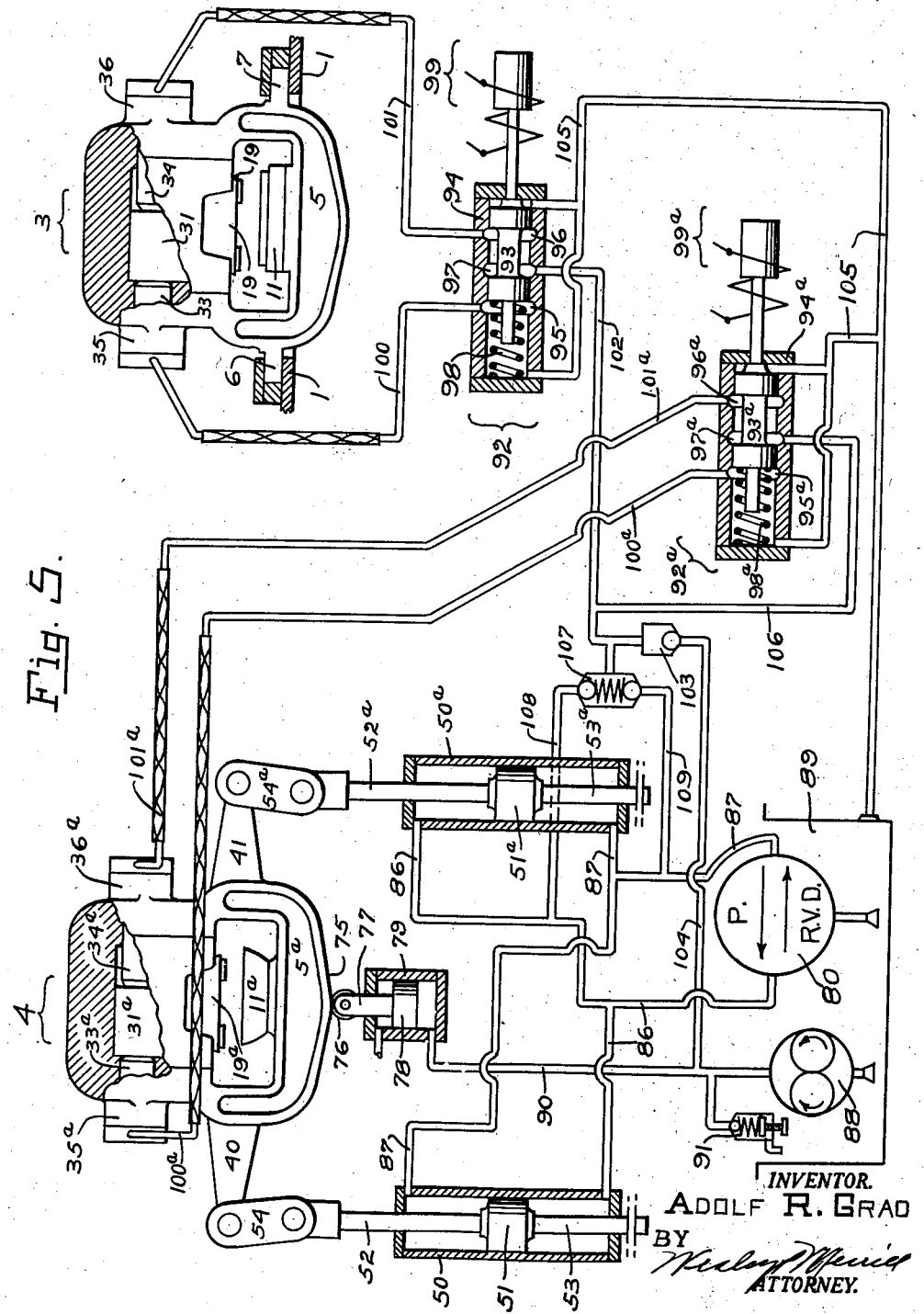

Patented Sept. 29, 1942

2,297,055

UNITED STATES PATENT OFFICE 2,297,055

TWISTING MACHINE

Adolf R. Grad, Wauwatosa, Wis., assignor to The Oilgear Company, Milwaukee, Wis., a corporation of Wisconsin Application April 29, 1940, Serial No. 332,162

18 Claims. (Cl. 153—78)

This invention relates to twisting machines and it is particularly adapted for twisting airplane propeller blades to correct inaccuracies in the pitch thereof.

Metal airplane propeller blades are ordinarily forged to a size somewhat greater than the finished size and to a pitch as near the correct pitch as is practically possible and then the blades are accurately machined to the exact size and pitch.

The present invention has as an object to provide a machine for twisting propeller blades correct to pitch thereof and thereby permit the blades to be forged very nearly to the finished size so that only a small amount of stock need be removed during the machining operation.

Another object is to provide a machine which will twist a work piece and maintain the axis of the twist upon the longitudinal centerline of the work piece.

Another object is to provide a machine which may be adjusted to enable the machine to make twists between various lengths.

Another object is to provide a machine which will operate in either direction and thereby either increase or decrease the pitch of a propeller blade.

Other objects and advantages will appear from the following description of a twisting machine embodying the invention and shown in part in detail and in part schematically in the accompanying drawings in which the views are as follows:

Fig. 5 is a diagram of the hydraulic circuit.

Figure 2:
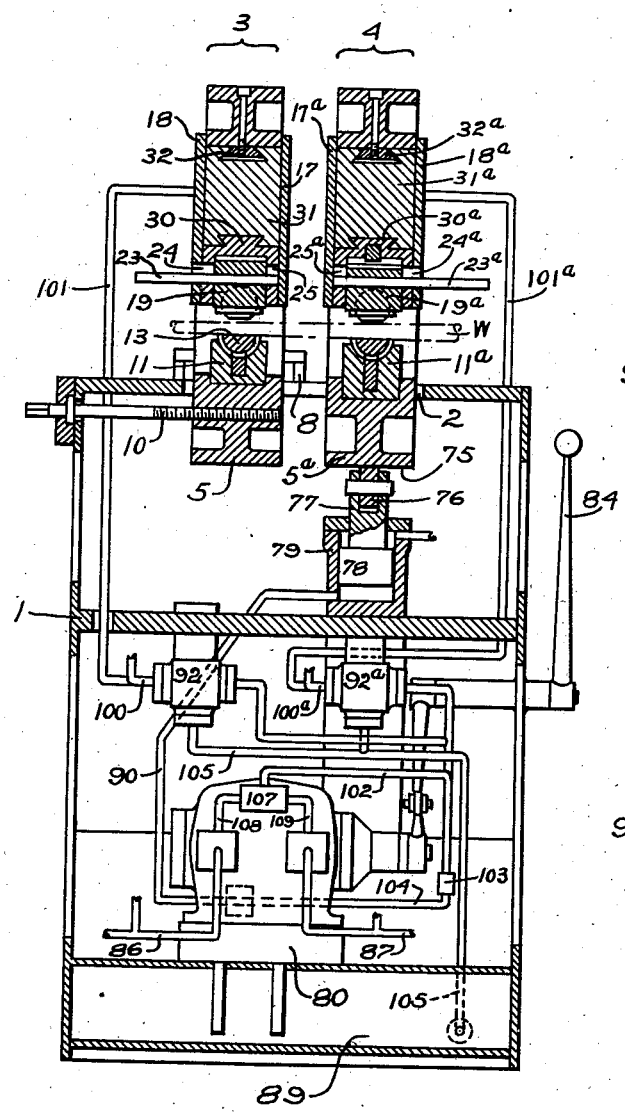
Fig. 2 is a vertical section taken on the irregular line 2—2 of Fig. 1.

The machine chosen for illustration has its mechanism carried by a frame 1 which has been shown constructed of steel plates welded together and with the top plate thereof provided with an opening 2 through which the lower parts of two clamps 3 and 4 extend as best shown in Fig. 2.

When the machine is in operation, clamp 3 is fixed in a stationary position and clamp 4 is rocked or rotated to impart a twist to a work piece clamped in both clamps, but clamp 3 is adjustable toward and from clamp 4 in order to vary the length of the twist imparted to the work piece.

Figure 3:
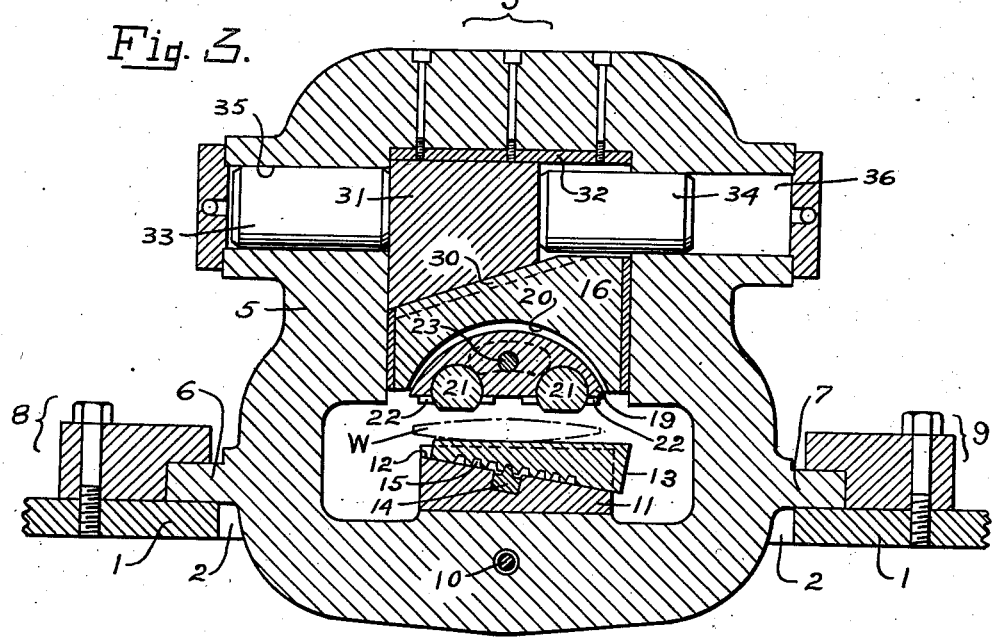
Fig. 3 is a vertical section through a stationary clamp in which one part of the work piece is fastened to hold it stationary.

As best shown in Fig. 3, clamp 3 includes a frame 5 which is supported upon frame 1 by means of two lugs 6 and 7 which are formed upon or fixed to opposite sides of clamp frame 5 and rest upon the top plate of main frame 1 at the opposite sides of opening 2.

Lugs 6 and 7 are arranged within two guides 8 and 9 which are formed in part by the top plate of frame 1 and permit clamp 3 to be moved toward and from clamp 4 but prevent it from moving in any other direction.

Adjustment of clamp 3 relative to clamp 4 may be effected by means of a screw 10 (Fig. 2) which is threaded into the lower part of clamp frame 5 and restrained from axial movement by the front plate of main frame 1 so that screw 10 when rotated will move clamp 3 toward and from clamp 4 and when stationary will rigidly retain clamp 3 in a stationary adjusted position.

Clamp 3 is adapted to have a work piece W, such as an airplane propeller blade, supported therein upon a work support arranged within frame 5 and consisting primarily of a block 11, which is fixed to the lower inner face of frame 5 and has a tapered-concave groove 12 formed therein transverse to the axis of the machine, and an abutment 13 having its upper side providing a working engaging face and its lower side formed complementary to groove 12 and fitted therein. The arrangement is such that abutment 13 may be moved along groove 12 to vary the elevation of its upper face and it may rotate in groove 12 to adjust its upper face to the work piece.

Since the pressure exerted upon abutment 13 might cause it to move toward the lower end of groove 12 and thereby reduce the effective height of the work support, a detent 14 is arranged within block 11 and adapted to engage any one of a plurality of circumferential grooves 15 which are formed in the arcuate surface of abutment 13 so that movement of abutment 13 along groove 12 can be effected only after abutment 13 has been raised clear of detent 14.

Work piece W is adapted to be forced against abutment 13 by a ram 16 which is guided for vertical reciprocation between parallel vertical faces formed upon the inside of frame 5 above the work support, suitable guide strips of dissimilar metal being ordinarily closely fitted between the frame and each end of ram 16, and two cover plates 17 and 18 (Fig. 2) being fixed to the upper part of frame 5 upon the front and rear sides thereof so that ram 16 may move vertically but is restrained from movement in any other direction.

In order that ram 16 may exert equal forces upon spaced apart points of an irregular shaped work piece, a gripper 19 (Fig. 3) having a substantially flat lower surface and a cylindrical upper surface is fitted into a complementary cylindrical recess 20 which is sunk into the lower face of ram 16, two spherical contact members 21 having substantially flat lower faces are fitted into complementary spherical recesses which are sunk into the lower face of gripper 19 upon opposite sides of the vertical centerline thereof, and each contact member 21 is retained in position by a keeper plate 22 which is attached to the lower face of gripper 19 and permits the contact member to rotate in its recess to adjust its contact face to the work piece.

Figure 1:
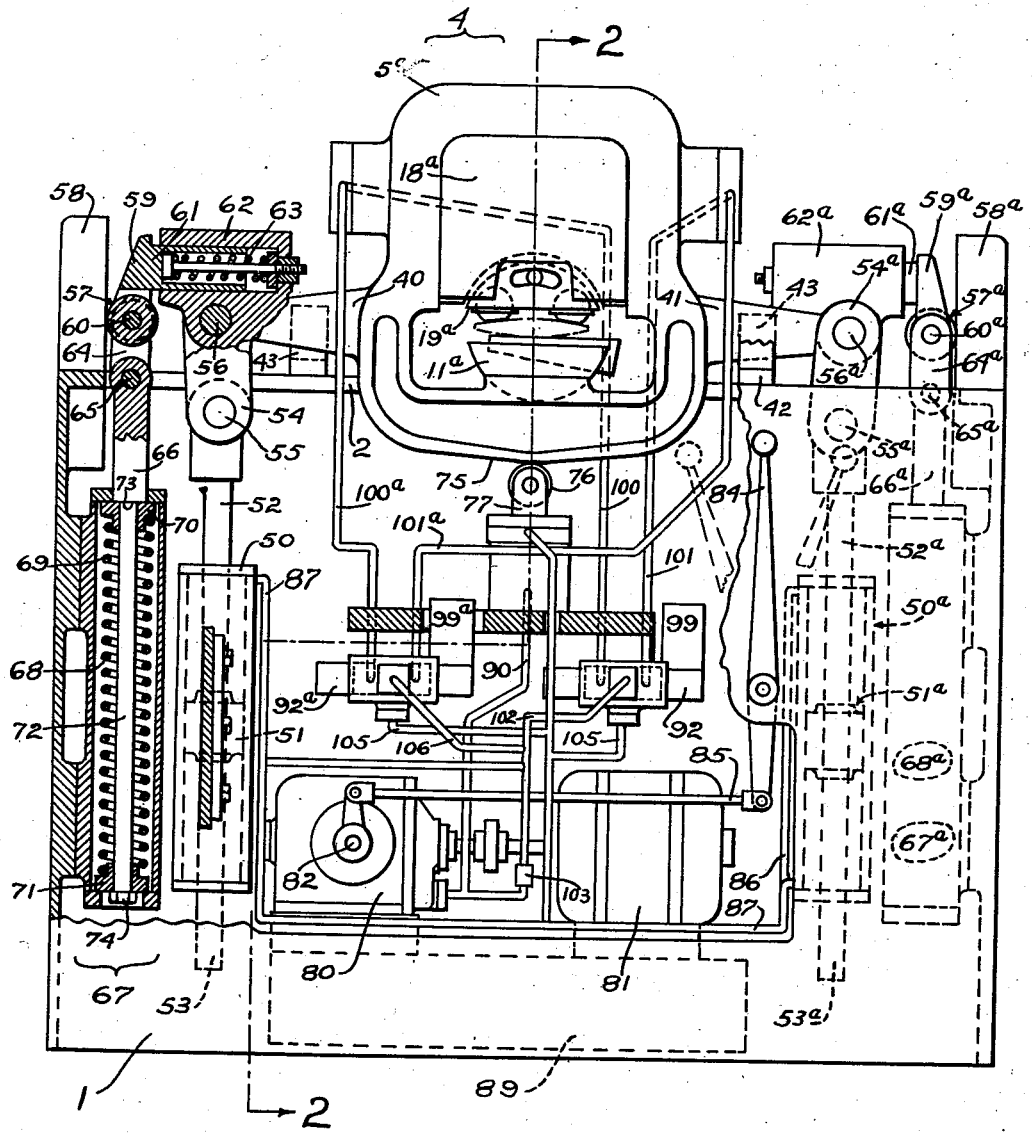
Fig. 1 is a front elevation of the machine with certain parts broken away to expose other parts and with certain parts in section.

When ram 16 is in its upper position, gripper 19 is supported by a rod 23 which extends therethrough and is supported in two arcuate slots 24 and 25 (Fig. 2) formed in the end walls of recess 20, the lower part of cover plate 18 being cut away as shown in Fig. 1 and rod 23 being extended beyond cover plate 18 so that gripper 19 may be adjusted in recess 20 by manipulating rod 23.

Ram 16 has its upper end beveled as shown in Fig. 3 and connected by a tongue and groove connection 30 (Fig. 2) to the beveled lower end of a wedge 31 which is arranged in the upper part of clamp frame 5 and connected by a tongue and groove connection 32 to the inner upper face thereof so that movement of wedge 31 toward the right in respect to Fig. 3 will cause ram 16 to move downward and movement of wedge 31 toward the left will cause ram 16 to move upward. Wedge 31 has been shown as bearing directly against the upper end of ram 16 and the inner upper face of frame 5 but in practice bearing plates of dissimilar metal are fitted therebetween and form parts of the tongue and groove connections.

Wedge 31 is adapted to be moved first in one direction and then in the opposite direction by two pistons 33—34 which engage opposite ends thereof and are fitted, respectively, in two cylinders 35 and 36 formed in frame 5. It will be obvious that, when motive liquid is supplied to cylinder 35, piston 33 will move wedge 31 toward the right in respect to Fig. 3 and wedge 31 will move ram 16 downward and cause contact members 21 to press work W against abutment 13 and, when motive liquid is supplied to cylinder 36, piston 34 will move wedge 31 toward the left in respect to Fig. 3 and, because of tongue and grove connections 30 and 32, wedge 31 will raise ram 16 to move contact members 21 away from work W.

Clamp 4 differs from clamp 3 in that it is adapted to be rocked or rotated to impart a twist to a work piece, its work support is adjustable to vary the angle of its work supporting face, and its gripper may be locked in adjusted position. Since clamp 4 is otherwise the same as clamp 3, corresponding parts have been indicated by corresponding reference numerals with the exponent "a" added to the reference numerals applied to clamp 4 and no further description of the parts which are identical will be given.

As shown, clamp 4 includes a frame 5ᵃ which is substantially the same as frame 5 except that, instead of being supported by means of lugs 6 and 7, it is provided upon its opposite sides with two arms 40 and 41 by means of which it is adapted to be rotated as will presently be explained. Movement of clamp 4 longitudinally of the machine is prevented by each of arms 40 and 41 being arranged between two guides 42 and 43 which are fixed to the top plate of main frame 1. (Fig. 1)

Figure 4:
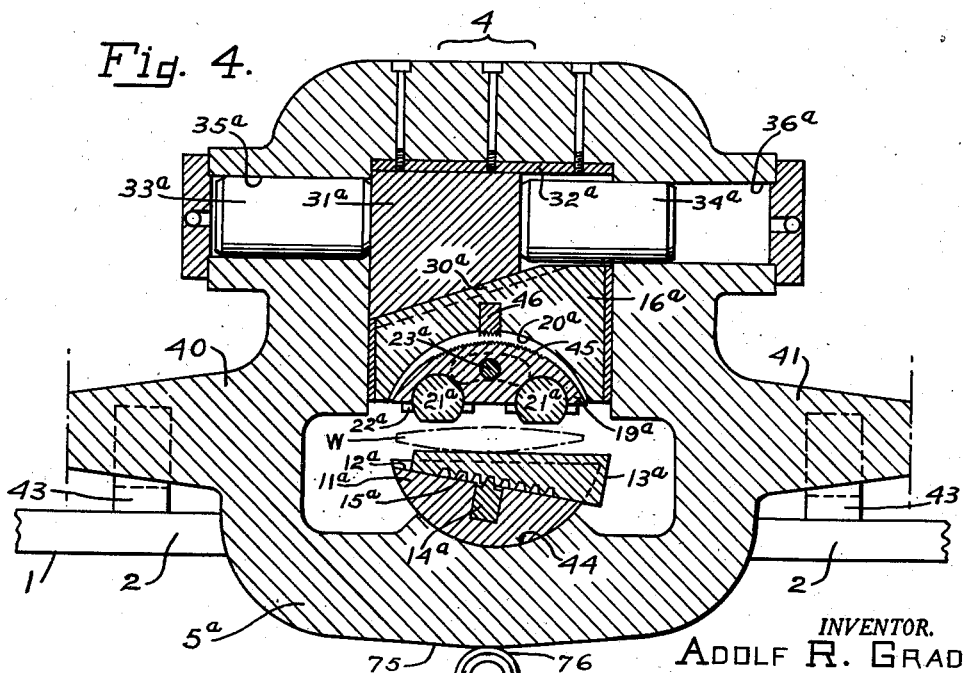
Fig. 4 is a vertical section through a clamp in which another part of the work piece is fastened and then the clamp is rocked or rotated to twist the work piece.

Work piece W is adapted to be supported within frame 5ᵃ upon a work support which differs from the work support of clamp 3 in that, instead of a fixed block 11, it is provided with an adjustable block 11ᵃ the lower side of which is cylindrical and fitted in a cylindrical recess 44 formed in the lower inner wall of frame 5ᵃ as shown in Fig. 4.

The work support of clamp 4 is otherwise the same as the work support of clamp 3 and it is deemed sufficient to state that its abutment 13ᵃ may be moved along groove 12ᵃ to vary the height of the work engaging face and held in adjusted position by its detent 14ᵃ and that its block 11ᵃ may be rotated in recess 44 and abutment 13ᵃ may be rotated in groove 12ᵃ to adjust the angle of the work engaging face of abutment 13ᵃ to the underside of work piece W.

Clamp 4 includes a ram 16ᵃ and a gripper 19ᵃ which has a cylindrical upper surface and is fitted in a complementary recess 20ᵃ formed in ram 16ᵃ. The ram and gripper are similar to ram 16 and gripper 19 of clamp 3, but the axis of the cylindrical surface of recess 20ᵃ is offset horizontally from the axis of the cylindrical surface of recess 44 so that, when a work piece is clamped between contact members 21ᵃ and abutment 13ᵃ and frame 5ᵃ is rocked or rotated, gripper 19ᵃ and block 11ᵃ tend to rotate in recesses 20ᵃ and 44 respectively but cannot do so for the reason that their axes are offset from each other.

However, it has been found in practice that, while offsetting the axes of recesses 20ᵃ and 44 will prevent rotation of gripper 19ᵃ and block 11ᵃ under many conditions, gripper 19ᵃ may yield slightly under certain conditions when frame 5ᵃ is rocked in one direction even though it does not yield under the same conditions when frame 5ᵃ is rocked in the opposite direction.

Therefore, in order to positively prevent rotation under all conditions, gripper 19ᵃ is provided in its cylindrical surface with a plurality of grooves 45 and ram 16ᵃ has a detent 46 fixed therein and extending into recess 20ᵃ to engage grooves 45 and hold gripper 19ᵃ in adjusted position. Gripper 19ᵃ may be adjusted by manipulating rod 23ᵃ to adjust contact members 21ᵃ to the upper side of the work piece and it will be in that position by detent 46 engaging grooves 45 when ram 16ᵃ is advanced to press contact members 21ᵃ against the work piece.

Since clamp 4 is otherwise the same as clamp 3, no further description thereof will be given, it being obvious that, when motive liquid is supplied to cylinder 35ᵃ, piston 33ᵃ will move wedge 31ᵃ toward the right and thereby cause ram 16ᵃ to move downward and clamp the work piece between contact members 21ᵃ and abutment 13ᵃ and, when motive liquid is supplied to cylinder 36ᵃ, piston 34ᵃ will move wedge 31ᵃ toward the left and thereby cause ram 16ᵃ to move upward and raise contact members 21ᵃ out of contact with the work piece.

Clamp 4 is adapted to be rocked or rotated by two double acting hydraulic motors one of which is arranged at one side of clamp 4 and consists primarily of a cylinder 50, which is rigidly secured to main frame 1, and a piston 51 which is fitted in cylinder 50. Piston 51 is provided with a piston rod 52, which extends through the upper end of cylinder 50, and with a tail rod 53 which is of the same diameter as piston rod 52 and extends through the lower end of cylinder 50. Piston rod 52 has its upper end arranged between two links 54 and connected thereto by a pin 55. Links 54 extend upward through a suitable opening in the top plate of frame 1 and have the upper ends thereof arranged upon opposite sides of arm 40 of clamp frame 5a and connected thereto by a pin 56.

The second hydraulic motor is exactly the same as motor 50—51 and is connected to frame 1 and to arm 41 of clamp frame 5a in exactly the same manner that motor 50—51 is connected to main frame 1 and to arm 40. Consequently, like parts have been indicated by like reference numerals with the exponent "a" added to the reference numerals applied to the second motor and no further description thereof is deemed necessary.

It will be obvious that, if a work piece is clamped in both of clamps 3 and 4 and motive liquid is supplied to the lower end of cylinder 50 and to the upper end of cylinder 50a, motor 50—51 will move arm 40 of clamp frame 5a upward and motor 50a—51a will move arm 41 of clamp frame 5a downward, thereby rotating clamp 4 to twist the work piece. Likewise, if motive liquid is supplied to the upper end of cylinder 50 and the lower end of cylinder 50a, motors 50—51 and 50a—51a will rotate clamp 4 in the opposite direction and thereby twist the work piece in the opposite direction.

Clamp 4 is restrained from movement toward the left in respect to Fig. 1 by a roller 57 which rides upon a vertical guide 58 carried by main frame 1. Roller 57 is arranged within a bifurcated plunger head 59 and journaled upon a pin 60 carried thereby. Head 59 is arranged upon the outer end of a hollow plunger 61 which is fitted in a cylinder 62 fixed to arm 40 of clamp frame 5a as by being formed integral therewith. Plunger 61 is urged outward by a caged spring 63 which is arranged within plunger 61 and cylinder 62 and holds roller 57 firmly against guide 58.

Clamp 4 is restrained from movement toward the right in respect to Fig. 1 by mechanism which corresponds exactly to the above described mechanism. Consequently, corresponding parts thereof have been indicated by corresponding reference numerals with the exponent "a" added thereto and no further description is deemed necessary.

Pins 60 and 60a are connected, respectively, by two pairs of links 64 and 64a and two pins 65 and 65a to the stems 66 and 66a of two spring equalizers 67 and 67a the cylinders 68 and 68a of which are fixed, respectively, to opposite side plates of main frame 1.

Equalizer 67 has a helical compression spring 69 arranged in its cylinder 68 between two spring retainers 70 and 71 slidably mounted on a rod 72 which is fixed at its upper end to stem 66. Rod 72 is smaller in diameter than stem 66 to form a shoulder 73 therebetween, and it has a nut or other suitable abutment 74 fixed upon its lower end with the upper face thereof spaced from shoulder 73 a distance equal to the distance between the inner faces of the end heads of cylinder 68.

Spring retainer 70 is normally held against shoulder 73 and against the upper head of cylinder 68 by spring 69 which also holds spring retainer 71 against abutment 74 and also against the lower head of cylinder 68 so that equalizer 67 normally holds arm 40 of clamp frame 5a in a stationary position. Equalizer 67a is identical to equalizer 67 and functions in the same manner to yieldingly hold arm 41 of clamp frame 5a in a stationary position.

When motors 50—51 and 50a—51a are energized and move one clamp arm upward and the other clamp arm downward to thereby rotate clamp 4 in one direction or the other, the spring of equalizer 67 will be compressed against one end of cylinder 68 and the spring of equalizer 67a will be compressed against the other end of cylinder 68a and, when motors 50—51 and 50a—51a are deenergized, the equalizer springs will expand and return clamp 4 to its normal position.

If equalizers 67 and 67a constituted the sole supports for clamp 4, motors 50—51 and 50a—51a when energized would not transmit equal forces to clamp arms 40 and 41 for the reason that one half of the weight of clamp 4 would assist the downward moving piston and the other half of the weight of clamp 4 would resist upward movement of the other piston. Consequently, clamp 4 would not be rotated about the axis of a work piece clamped in both of clamps 3 and 4 but would be moved downward by the downward moving piston and bend the work piece longitudinally thereof. This would be particularly true if motor cylinders 50 and 50a were connected to a pump in parallel with each other in which case the motor piston tending to move upward would remain stationary and the downward moving piston would move one side of clamp 4 downward twice as far as it would have moved it if the other piston could have moved the other side of clamp 4 upward.

If clamp 4 were mounted for rotation in a fixed bearing so that equalizers 67 and 67a would not be subjected to the weight thereof, it would be necessary to so adjust the work piece in clamp 4 that its center of gravity would coincide with the axis of rotation of clamp 4 which would be difficult particularly if the work piece should be a propeller blade.

In order to avoid the above mentioned difficulties, clamp frame 5a has an arcuate face 75 arranged upon its lower side and in engagement with a roller 76 mounted in the end of the piston rod 77 of a piston 78 which is fitted in a stationary cylinder 79 and adapted to have liquid supplied to the lower end thereof at a predetermined uniform pressure.

The area of piston 78 is such that the force exerted thereon by the liquid equals as nearly as possible the weight of clamp 4 and the movable parts supported thereby so that substantially none of this weight is supported by the equalizer springs. Consequently, no bending moment is imparted to the work piece due to the weight of clamp 4. Also, since the axis of a twist normally tends to coincide with the center of gravity of a work piece, piston 78 will either move clamp 4 upward or will yield to permit clamp 4 to move downward until the center of gravity of the work piece coincides with the axis of rotation of clamp 4, it being understood that abutment 13a is initially adjusted to bring the center of gravity of the work piece approximately to the axis of rotation of clamp 4.

Liquid for operating motors 50—51 and

50ᵃ—51ᵃ is supplied by a reversible variable displacement pump 80 which is driven by an electric motor 81 and is provided with a control mechanism 82 for shifting its displacement varying mechanism (not shown) in opposite directions from a neutral or zero displacement position. Control mechanism 82 is of the type having a rotary valve which controls operation thereof and which provides a bypass channel between the two sides of the pump when pump displacement is zero, such as the pump control mechanism shown in Patent No. 2,114,005. Pump 80 has been shown as being controlled manually by means of a lever 84 which is pivoted intermediate its ends upon main frame 1 and has its lower end connected by a link 85 to the valve of control mechanism 82.

As best shown in Fig. 5, pump 80 has one side thereof connected by a branched channel 86 to the lower end of cylinder 50 and the upper end of cylinder 50ᵃ. The other side of pump 80 is connected by a branched channel 87 to the upper end of cylinder 50 and the lower end of cylinder 50ᵃ. Motors 50—51 and 50ᵃ—51ᵃ are thus connected to pump 80 in parallel with each other.

The arrangement is such that, when lever 84 is shifted in one direction or the other from its central or neutral position, control mechanism 82 will cause pump 80 to deliver liquid either into channel 86 or into channel 87 and, when lever 84 is returned to its neutral position, control mechanism 82 will reduce the displacement of pump 80 to zero, so that no liquid is delivered thereby, and it will also provide a bypass between channels 86 and 87 so that liquid can flow freely from one end of each of motor cylinders 50 and 50ᵃ to the other end thereof and thereby permit equalizers 67 and 67ᵃ to return clamp 4 and motor pistons 51 and 51ᵃ to their normal positions after the clamps are opened.

Liquid for operating clamps 3 and 4 and for maintaining pressure in cylinder 79 is supplied by an auxiliary pump, such as a gear pump 88 which has been shown in Fig. 5 as being separate from pump 80 but which is arranged in the casing thereof and driven in unison therewith according to the usual practice.

Pump 88 draws liquid from a reservoir 89 and discharges it at a rate in excess of requirements into a channel 90 which is connected to the lower end of cylinder 79 the upper end of which is open to drain. The excess liquid discharged by pump 88 is exhausted through a relief valve 91 which is connected to channel 90 and enables pump 88 to maintain in channel 90 and in cylinder 79ᵃ uniform low pressure of the value necessary to enable piston 78 to support clamp 4.

The delivery of liquid from gear pump 88 to clamp 3 is under the control of a valve 92 which has been shown in Fig. 5 as having a valve member 93 arranged in the bore of a valve casing 94 to control communication between three annular grooves or ports 95, 96 and 97 formed therein. Valve member 93 is urged toward the right in respect to Fig. 5 by a spring 98 and it is adapted to be moved toward the left by a solenoid 99 which is controlled by suitable manually operable switches not shown.

Ports 95 and 96 are connected, respectively, to clamp cylinders 35 and 36 by two channels 100 and 101 each of which contains a flexible section in order that clamp 3 may be moved toward and from clamp 4. Port 97 is connected through a channel 102, a check valve 103 and a channel 104 to gear pump supply channel 90 intermediate the ends thereof, check valve 103 permitting liquid to flow freely from channel 104 into channel 102 but preventing it from flowing in the opposite direction. In order that valve member 93 may be moved freely, both ends of cylinder 94 are connected to a drain channel 105 which discharges into reservoir 89.

Figure 7:
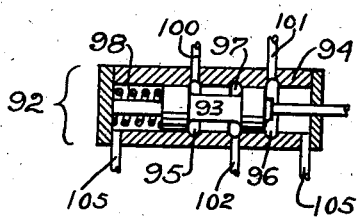
Fig. 7 is a view showing another valve in a position different from that shown in Fig. 5.

The arrangement is such that, when solenoid 99 is energized and moves valve member 93 toward the left to the position shown in Fig. 7, liquid will flow from gear pump 88 through channels 90 and 104, check valve 103, channel 102, valve casing 94 and channel 100 to cylinder 35 and cause piston 33 to move wedge 31 toward the right to close clamp 3, piston 34 being moved toward the right and expelling liquid from cylinder 36 through channel 101, valve casing 94 and channel 105 into reservoir 89.

When solenoid 99 is deenergized, spring 98 will move valve member 93 toward the right to the position shown in Fig. 5 and then the liquid delivered through channel 102 to valve casing 94 will flow through channel 101 to cylinder 36 and cause piston 34 to move wedge 31 toward the left to open clamp 3, piston 33 being moved toward the left and expelling liquid from cylinder 35 through channel 100 and valve casing 94 into drain channel 105.

The delivery of liquid from gear pump 88 to clamp 4 is under the control of a valve 92ᵃ which is exactly the same as valve 92. Consequently, a description thereof is deemed unnecessary, like parts being indicated by like reference numerals with the exponent "a" added to the numerals applied to valve 92ᵃ. Solenoid 99ᵃ of valve 92ᵃ is controlled by suitable manually operable switches (not shown) which are independent of the switches for controlling solenoid 99.

Valve 92ᵃ has both ends of its casing 94ᵃ connected to drain channel 105, its port 97ᵃ connected by a channel 106 to channel 102 intermediate the ends thereof, and its ports 95ᵃ and 96ᵃ connected to clamp cylinders 35ᵃ and 36ᵃ, respectively, by two channels 100ᵃ and 101ᵃ each of which includes a flexible section so that clamp 4 may be rotated to twist a work piece.

Figure 6:
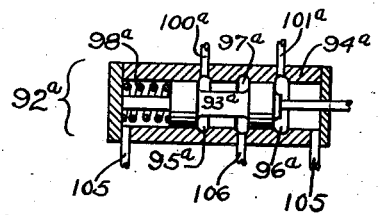
Fig. 6 is a view showing a valve in a position different from that shown in Fig. 5.

The arrangement is such that, when solenoid 99ᵃ is energized and moves valve member 93ᵃ toward the left to the position shown in Fig. 6, liquid will flow from gear pump 88 through channels 90 and 104, check valve 103, channels 102 and 106, valve casing 94ᵃ and channel 100ᵃ to cylinder 35ᵃ and cause piston 33ᵃ to move wedge 31ᵃ toward the right and close clamp 4, piston 34ᵃ being moved toward the right and expelling liquid from cylinder 36ᵃ through channel 101ᵃ, valve casing 94ᵃ and channel 105 into reservoir 89.

When solenoid 99ᵃ is deenergized, spring 98ᵃ will move valve member 93ᵃ toward the right to the position shown in Fig. 5 and then the liquid delivered through channel 106 to valve casing 94ᵃ will flow through channel 101ᵃ to cylinder 36ᵃ and cause piston 34ᵃ to move wedge 31ᵃ toward the left to open clamp 4, piston 33ᵃ being moved toward the left and expelling liquid from cylinder 35ᵃ through channel 100ᵃ and valve casing 94ᵃ into drain channel 105.

In order that clamps 3 and 4 may be held closed with a force proportional to the force applied to the work piece to twist it, channel 102 is connected to the outlet of a double check valve 107 which has one of its inlets connected by channel 108 to channel 86 and its other inlet connected by channel 109 to channel 87.

When pump 80 is delivering liquid to cylinders 50 and 50ᵃ to twist a work piece and the pressure created by it exceeds the pressure created by gear pump 88, that end of check valve 107 which is connected to the high pressure side of the circuit of pump 80 will open and permit the high pressure to extend to the clamp cylinders but the other end of check valve 107 will remain closed to prevent liquid from flowing into the return side of that circuit, and check valve 103 will prevent the high pressure from extending into channel 104.

Operation

If the parts are in the positions shown, if pumps 80 and 88 are running and if it is desired to twist a propeller blade to correct the pitch thereof, screw 10 is rotated until the distance between clamps 3 and 4 corresponds to the length of the section of blade to be twisted, the blade is placed within clamps 3 and 4 as shown in dotted line in Figs. 3 and 4 and moved longitudinally until the section to be twisted lies between the clamps, abutments 13 and 13ᵃ are adjusted to so support the blade that its center of gravity will approximately coincide with the axis of rotation of clamp 4, and then a switch is closed to energize solenoid 99 which will shift valve member 93 toward the left to direct gear pump liquid to clamp cylinder 35, thereby causing clamp 3 to close and grip the propeller blade as previously explained.

If no further adjustment of clamp 4 is necessary, a switch is closed to energize solenoid 99ᵃ which will shift valve member 93ᵃ toward the left to direct gear pump liquid to cylinder 35ᵃ, thereby causing clamp 4 to close as previously explained. As clamp 4 closes, one contact member 21ᵃ will engage the blade and rotate gripper 19ᵃ in recess 20ᵃ until both contact members 21ᵃ bear evenly on the blade, then detent 46 will engage grooves 45 to prevent further rotation of gripper 19ᵃ and finally the blade is gripped firmly between contact members 21ᵃ and abutment 13ᵃ, block 11ᵃ having been previously rotated in recess 44 until the upper face of abutment 13ᵃ is parallel to the lower face of the blade.

Control lever 84, which is ordinarily held in its neutral position by suitable springs, is then operated to cause pump 80 to deliver liquid to opposite ends of motor cylinders 50 and 50ᵃ and thereby cause the motor to rotate clamp 4 to impart a twist to the blade.

If clamp 4 is to be rotated in a clockwise direction in respect to Fig. 5, lever 84 is moved in a direction to cause pump 80 to deliver liquid into channel 86. This liquid will move piston 51 upward and piston 51ᵃ downward and the liquid expelled from the cylinders by the pistons will flow through channel 87 to the intake of pump 80.

If clamp 4 is to be rotated in the opposite direction, lever 84 is moved in a direction to cause pump 80 to deliver liquid into channel 87. This liquid will move piston 51 downward and piston 51ᵃ upward and the liquid expelled from the cylinders by the pistons will flow through channel 86 to the intake of pump 80.

Pistons 51 and 51ᵃ will rotate clamp 4 and compress the equalizer springs. As soon as the pressure created by pump 80 exceeds gear pump pressure, check valve 107 will open and permit the high pressure to extend to clamp cylinders 35 and 35ᵃ so that clamps 3 and 4 are held closed by a force proportional to the twisting force applied to clamp 4.

Rotation of clamp 4 will twist that section of the propeller blade between the clamps to correct the pitch thereof and, when the pitch is corrected, lever 84 is returned to its neutral position and solenoid 99ᵃ is deenergized to permit clamp 4 to open and release the blade and then the equalizer springs will return clamp 4 and pistons 51 and 51ᵃ to their normal positions, the neutral bypass in pump control mechanism 82 permitting each of the pistons to move freely and transfer liquid from one end of its cylinder to the other end thereof.

Solenoid 99 is then deenergized to permit clamp 3 to open and release the blade which is then shifted longitudinally in clamps 3 and 4 and the operation repeated until the pitch of the entire blade is correct.

The twisting machine herein described is susceptible of various modifications and adaptations without departing from the scope of the invention which is hereby claimed as follows:

1. In a twisting machine, the combination of a first clamp arranged in a stationary position, means for operating said clamp to clamp a work piece therein, a second clamp, means for yieldably holding said second clamp in a stationary position in alinement with said first clamp and tending to resist rotation of said second clamp, means for operating said second clamp to fix it to said work piece, and means for rotating said second clamp to thereby twist said work piece.

2. In a twisting machine, the combination of a first clamp arranged in a stationary position, means for operating said clamp to clamp a work piece therein, a second clamp, means for yieldably holding said second clamp in a stationary position in alinement with said first clamp and tending to resist rotation of said second clamp, means for operating said second clamp to fix it to said work piece, means for rotating said second clamp to thereby twist said work piece, and yieldable means for supporting the weight of said second clamp to thereby relieve the first mentioned yieldable means of said weight.

3. In a twisting machine, the combination of a first clamp arranged in a stationary position, hydraulic means for operating said clamp to clamp a work piece therein, a second clamp, yieldable means tending to hold said second clamp stationary and in alinement with said first clamp, hydraulic means for operating said second clamp to fix it to said work piece, hydraulic means for rotating said second clamp to thereby twist said work piece, a low pressure pump, a high pressure pump, means for directing liquid from said low pressure pump to said hydraulic clamp operating means to cause the same to close said clamps upon said work piece to exert a holding force thereon, means for directing liquid from said high pressure pump to said hydraulic rotating means to energize the same, and means effective in response to the delivery of liquid to said hydraulic rotating means for subjecting said hydraulic clamp operating means to the pressure created by said high pressure pump.

4. In a twisting machine, the combination of a first clamp arranged in a stationary position, means for operating said clamp to clamp a work piece therein, a second clamp, yieldable means tending to hold said second clamp stationary and in alinement with said first clamp, means for operating said second clamp to fix it to said work piece, two double acting hydraulic motors connected to said second clamp upon opposite sides thereof, and means for directing motive liquid to one end or the other of one of said motors and to the opposite end of the other of said motors to cause said motors to rotate said second clamp in one direction or the other to thereby twist said work piece.

5. In a twisting machine, the combination of a first clamp arranged in a stationary position, means for operating said clamp to clamp a work piece therein, a second clamp, yieldable means tending to hold said second clamp stationary and in alinement with said first clamp, means for operating said second clamp to fix it to said work piece, two double acting hydraulic motors connected to said second clamp upon opposite sides thereof, means for directing motive liquid to one end or the other of one of said motors and to the opposite end of the other of said motors to cause said motors to rotate said second clamp in one direction or the other to thereby twist said work piece, and yieldable means for supporting the weight of said second clamp to thereby relieve the first mentioned yieldable means of said weight.

6. In a twisting machine, the combination of a first clamp arranged in a stationary position, hydraulic means for operating said clamp to clamp a work piece therein, a second clamp, yieldable means tending to hold said second clamp stationary and in alinement with said first clamp, hydraulic means for operating said second clamp to fix it to said work piece, two double acting hydraulic motors connected to said second clamp upon opposite sides thereof, a low pressure pump, a high pressure pump, means for directing liquid from said low pressure pump to said hydraulic clamp operating means to cause the same to close said clamps upon said work piece to exert a holding force thereon, means for directing liquid from said high pressure pump to one end or the other of one of said motors and to the opposite end of the other of said motors to cause said motors to rotate said second clamp in one direction or the other to thereby twist said work piece, and means effective in response to the delivery of liquid to said hydraulic motors for subjecting said hydraulic clamp operating means to the pressure created by said high pressure pump.

7. In a twisting machine, the combination of a first clamp arranged in a stationary position, means for operating said clamp to clamp a work piece therein, a second clamp, two guides arranged upon opposite sides of said second clamp, two spring pressed rollers carried by said second clamp upon opposite sides thereof to engage said guides and retain said second clamp in alinement with said first clamp, means including two caged springs connected to said second clamp upon opposite sides thereof for yieldably holding said second clamp stationary, means for operating said second clamp to fix it to said work piece, and means for rotating said second clamp to thereby twist said work piece.

8. In a twisting machine, the combination of a first clamp arranged in a stationary position, means for operating said clamp to clamp a work piece therein, a second clamp, two guides arranged upon opposite sides of said second clamp, two spring pressed rollers carried by said second clamp upon opposite sides thereof to engage said guides and retain said second clamp in alinement with said first clamp, means including two caged springs connected to said second clamp upon opposite sides thereof for yieldably holding said second clamp stationary, means for operating said second clamp to fix it to said work piece, two double acting hydraulic motors connected to said second clamp upon opposite sides thereof, and means for directing motive liquid to one and or the other of one of said motors and to the opposite end of the other of said motors to cause said motors to rotate said second clamp in one direction or the other to thereby twist said work piece.

9. In a twisting machine, the combination of a first clamp arranged in a stationary position, means for operating said clamp to clamp a work piece therein, a second clamp, two guides arranged upon opposite sides of said second clamp, two spring pressed rollers carried by said second clamp upon opposite sides thereof to engage said guides and retain said second clamp in alinement with said first clamp, means including two caged springs connected to said second clamp upon opposite sides thereof for yieldably holding said second clamp stationary, yieldable means for supporting the weight of said second clamp to thereby relieve said caged springs of said weight, means for operating said second clamp to fix it to said work piece, two double acting hydraulic motors connected to said second clamp upon opposite sides thereof, and means for directing motive liquid to one end or the other of one of said motors and to the opposite end of the other of said motors to cause said motors to rotate said second clamp in one direction or the other to thereby twist said work piece.

10. In a twisting machine, the combination of a first clamp arranged in a stationary position, hydraulic means for operating said clamp to clamp a work piece therein, a second clamp, two guides arranged upon opposite sides of said second clamp, two spring pressed rollers carried by said second clamp upon opposite sides thereof to engage said guides and retain said second clamp in alinement with said first clamp, means including two caged springs connected to said second clamp upon opposite sides thereof for yieldably holding said second clamp stationary, hydraulic means for operating said second clamp to fix it to said work piece, two double acting hydraulic motors connected to said second clamp upon opposite sides thereof, a low pressure pump, a high pressure pump, means for directing liquid from said low pressure pump to said hydraulic clamp operating means to cause the same to close said clamps upon said work piece to exert a holding force thereon, means for directing liquid from said high pressure pump to one end or the other of one of said motors and to the opposite end of the other of said motors to cause said motors to rotate said second clamp in one direction or the other to thereby twist said work piece, and means effective in response to the delivery of liquid to said hydraulic motors for subjecting said hydraulic clamp operating means to the pressure created by said high pressure pump.

11. In a machine for twisting a work piece, the combination of a clamp frame, a work support carried by said frame upon the inside thereof, a ram guided by said frame for movement toward and from said work support and having a substantially cylindrical recess formed in the end thereof facing said work support, a gripper carried by said ram and having one side thereof cylindrical and fitted in said recess so that said gripper may be rotated to adjust its other side to said work piece, a wedge fitted between the other end of said ram and the inner face of said frame opposite said work support, means for advancing said wedge to thereby advance said ram and cause it to clamp said work piece between said gripper and said work support, and means for retracting said wedge and said ram to thereby release said work piece.

12. In a machine for twisting a work piece, the combination of a clamp frame, a work support carried by said frame upon the inside thereof, a ram guided by said frame for movement toward and from said work support and having a substantially cylindrical recess formed in the end thereof facing said work support, a gripper carried by said ram and having one side thereof cylindrical and fitted in said recess so that said gripper may be rotated to adjust its other side to said work piece, a wedge fitted between the other end of said ram and the inner face of said frame opposite said work support, means for advancing said wedge to thereby advance said ram and cause it to clamp said work piece between said gripper and said work support, means for retracting said wedge, and tongue and groove connections connecting said wedge to said frame and to said ram so that retraction of said wedge causes said ram to be retracted and release said work piece.

13. In a machine for twisting a work piece, the combination of a clamp frame, a work support carried by said frame upon the inside thereof, a ram guided by said frame for movement toward and from said work support and having a substantially cylindrical recess formed in the end thereof facing said work support, a gripper carried by said ram and having one side thereof cylindrical and fitted in said recess so that said gripper may be rotated to adjust its other side to said work piece, said work support having a substantially conical groove formed therein longitudinally of said frame and an abutment having one side thereof substantially conical and fitted in said groove and the other side thereof providing a contact surface for said work piece so that rotation of said abutment will adjust its contact surface relative to said work piece and longitudinal movement of said abutment will vary the distance between its contact surface and said gripper, a wedge fitted between the other end of said ram and the inner face of said frame opposite said work support, means for advancing said wedge to thereby advance said ram and cause it to clamp said work piece between said gripper and said work support, and means for retracting said wedge and said ram to thereby release said work piece.

14. In a machine for twisting a work piece, the combination of a clamp frame, a work support carried by said frame upon the inside thereof, a ram guided by said frame for movement toward and from said work support and having a substantially cylindrical recess formed in the end thereof facing said work support, a gripper carried by said ram and having one side thereof cylindrical and fitted in said recess and substantially semi-spherical sockets arranged in the opposite side thereof, a substantially spherical contact member fitted in each of said sockets and having a contact face to engage said work piece, means for retaining said contact members in said sockets, said gripper being adjustable in said recess to adjust said contact members to said work piece, a wedge fitted between the other end of said ram and the inner face of said frame opposite said work support, means for advancing said wedge to thereby advance said ram and cause it to clamp said work piece between said contact members and said work support, and means for retracting said wedge and said ram to thereby release said work piece.

15. In a machine for twisting a work piece, the combination of a clamp frame, a work support carried by said frame upon the inside thereof, a ram guided by said frame for movement toward and from said work support and having a substantially cylindrical recess formed in the end thereof facing said work support, a gripper carried by said ram and having one side thereof cylindrical and fitted in said recess and substantially semi-spherical sockets arranged in the opposite side thereof, a substantially spherical contact member fitted in each of said sockets and having a contact face to engage said work piece, means for retaining said contact members in said sockets, said gripper being adjustable in said recess to adjust said contact members to said work piece, a wedge fitted between the other end of said ram and the inner face of said frame opposite said work support, means for advancing said wedge to thereby advance said ram and cause it to clamp said work piece between said contact members and said work support, means for retracting said wedge, and tongue and groove connections connecting said wedge to said frame and to said ram so that retraction of said wedge causes said ram to be retracted and release said work piece.

16. In a machine for twisting a work piece, the combination of a clamp frame, a work support carried by said frame upon the inside thereof, a ram guided by said frame for movement toward and from said work support and having a substantially cylindrical recess formed in the end thereof facing said work support, a gripper carried by said ram and having one side thereof cylindrical and fitted in said recess and substantially semi-spherical sockets arranged in the opposite side thereof, a substantially spherical contact member fitted in each of said sockets and having a contact face to engage said work piece, means for retaining said contact members in said sockets, said gripper being adjustable in said recess to adjust said contact members to said work piece, said work support having a substantially conical groove formed therein longitudinally of said frame and an abutment having one side thereof substantially conical and fitted in said groove and the other side thereof providing a contact surface for said work piece so that rotation of said abutment will adjust its contact surface relative to said work piece and longitudinal movement of said abutment will vary the distance between its contact surface and said gripper, a wedge fitted between the other end of said ram and the inner face of said frame opposite said work support, means for advancing said wedge to thereby advance said ram and cause it to clamp said work piece between said contact members and said contact surface, and means for retracting said wedge and said ram to thereby release said work piece.

17. In a twisting machine having a frame, the combination of a first clamp carried by said frame in a normally stationary position, a second clamp carried by said frame in alinement with said first clamp, each of said clamps having an opening therethrough so that a work piece may extend through both clamps and be adjusted longitudinally of said frame to arrange different sections of said work piece between said clamps, means for operating each of said clamps to clamp said work piece therein, means for applying a rotative force to said second clamp to rotate the same and thereby impart a twist to the section of work piece between said clamps, manual means continuously operable during operation of said force applying means to control the operation thereof to thereby selectively vary the angle through which said second clamp is rotated, and means for returning said second clamp to its initial position in response to said rotative force being removed.

18. In a twisting machine having a frame, the combination of a first clamp carried by said frame in a normally stationary position, a second clamp carried by said frame in alinement with said first clamp, each of said clamps having an opening therethrough so that a work piece may extend through both clamps and be adjusted longitudinally of said frame to arrange different sections of said work piece between said clamps, means for operating each of said clamps to clamp said work piece therein, means for applying a rotative force to said second clamp to rotate the same and thereby impart a twist to the section of work piece between said clamps, manual means continuously operable during operation of said force applying means to control the operation thereof to thereby selectively vary the angle through which said second clamp is rotated, and yieldable means tending to resist rotation of said second clamp and adapted to return said second clamp to its initial position after said rotative force is removed.

ADOLF R. GRAD.